United States Patent [19]
Terzian et al.

[11] 3,772,824
[45] Nov. 20, 1973

[54] TOY VEHICLE APPARATUS

[75] Inventors: Rouben T. Terzian; Marvin I. Glass, both of Chicago; Ira B. Gilford, Highland Park, all of Ill.

[73] Assignee: Marvin Glass & Associates

[22] Filed: Dec. 30, 1971

[21] Appl. No.: 213,866

[52] U.S. Cl. ................................................ 46/206
[51] Int. Cl. ............................................ A63h 17/00
[58] Field of Search...................... 46/201, 202, 206, 46/211, 212, 213, 243, 221

[56] References Cited
UNITED STATES PATENTS

| | | | |
|---|---|---|---|
| 3,574,267 | 4/1971 | Schorsch.............................. | 46/211 |
| 2,794,295 | 6/1957 | Robertson............................. | 46/201 |
| 2,168,788 | 8/1939 | Biller .................................... | 46/211 |
| 2,124,302 | 7/1938 | Lohr et al............................. | 46/211 |

Primary Examiner—Louis G. Mancene
Assistant Examiner—D. L. Weinhold
Attorney—James F. Coffee et al.

[57] ABSTRACT

A toy vehicle capable of being selectively conditioned to have varying operating characteristics, particularly "trick" type operations. The vehicle has a pair of front wheels and a pair of back wheels, one of the back wheels being fixed axially of and rotatable with the rear axle and driven by motor means, through the axle. The other rear wheel is freely rotatable relative to and slidably mounted on the rear axle and is of a larger diameter than said one rear wheel. The vehicle may be caused to spin about the larger diameter wheel, or travel in a straight or curved path depending upon the axial disposition of the slidably mounted larger diameter wheel. The vehicle is designed with its center of gravity close to the rear axle, and the motor means is mounted on a framework pivoted about the rear axle, so that the motor means may be shifted fore and aft, changing the center of gravity and causing the vehicle to rock about the rear axle. These various motions are programmed by conditioning the various operative components of the vehicle by means of a power conditioning drive ramp and guide track. Interchangeable plates are provided for mounting on the end of the guide track. The plates have upwardly protruding tabs which are operatively engageable with the operative components of the vehicle to condition the vehicle and thereby program its operating characteristics. The drive ramp also includes an oscillating lever and gear linkage for conditioning a winding power source on the vehicle.

21 Claims, 15 Drawing Figures

PATENTED NOV 20 1973　　　　　　　　　3,772,824
SHEET 1 OF 4
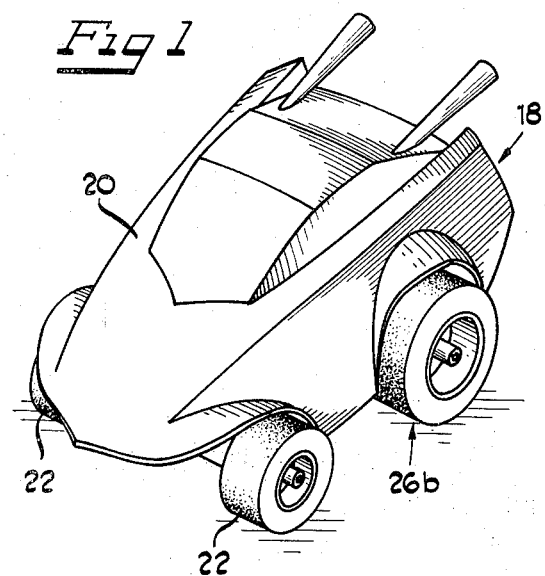
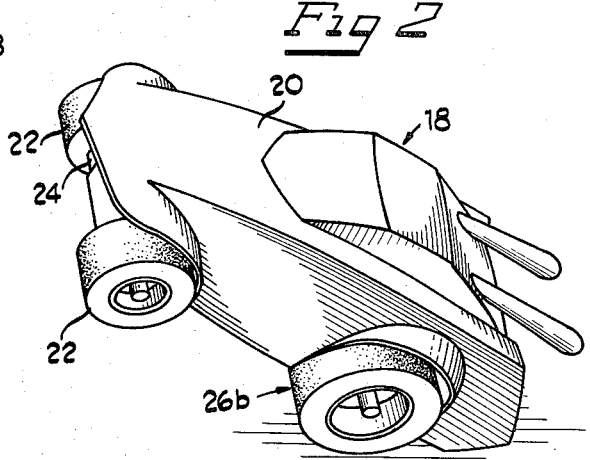
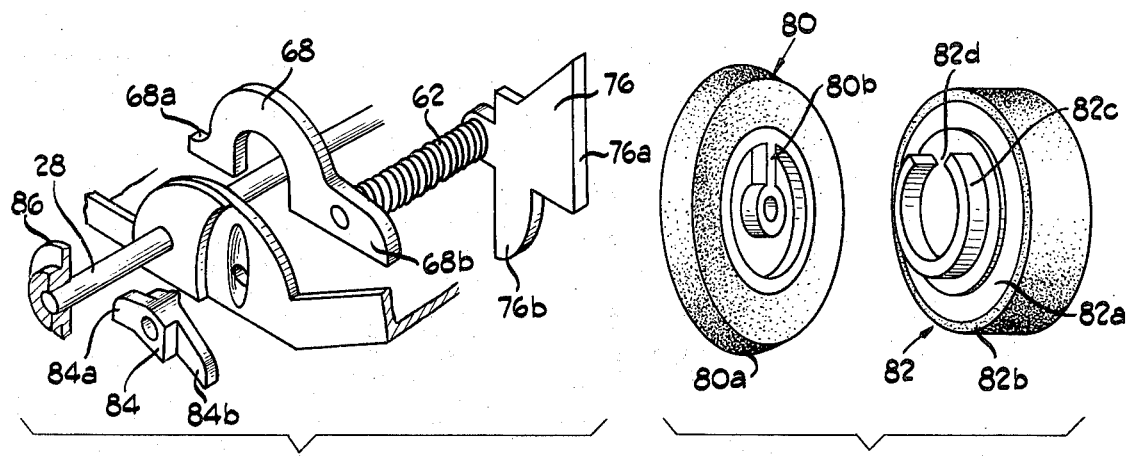
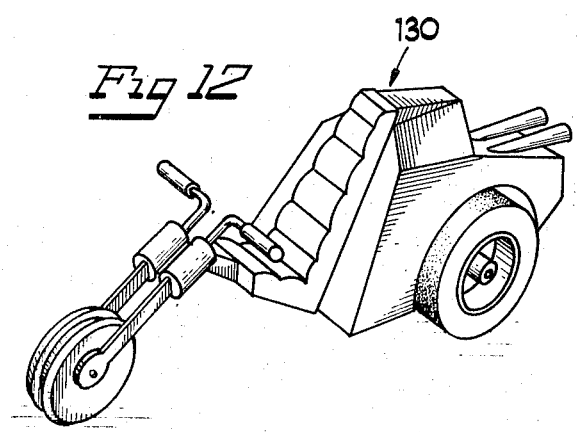
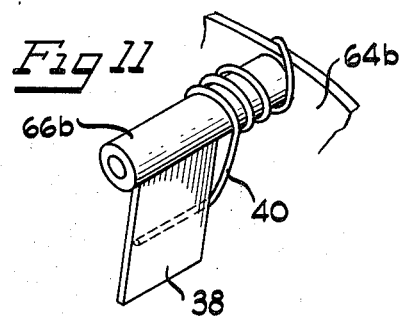
INVENTORS
ROUBEN T. TERZIAN
MARVIN I. GLASS
IRA B. GILFORD
BY Coffee, Wetzel & Sweeney
ATTORNEYS

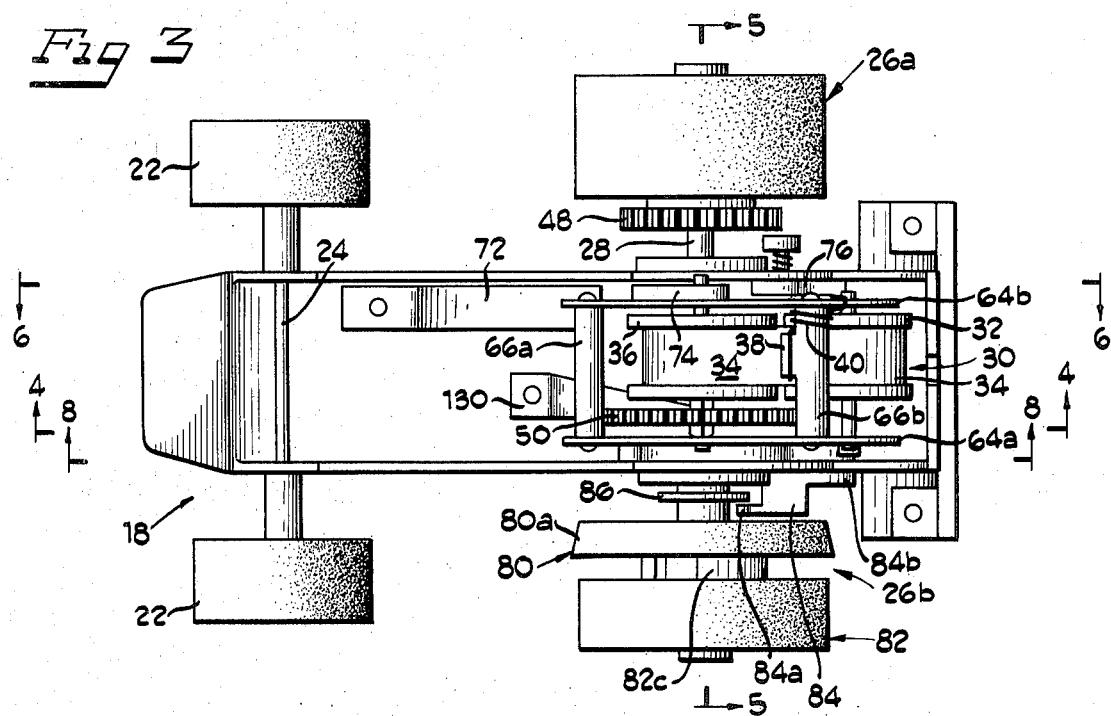
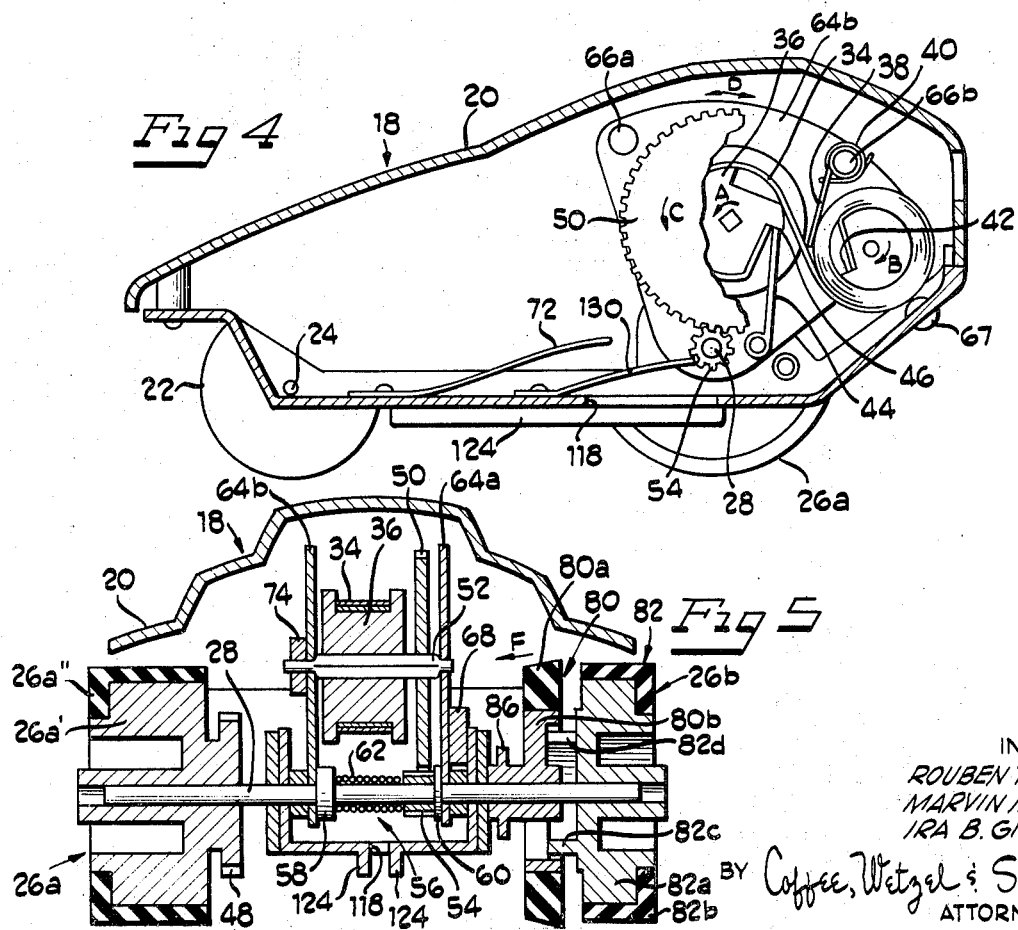

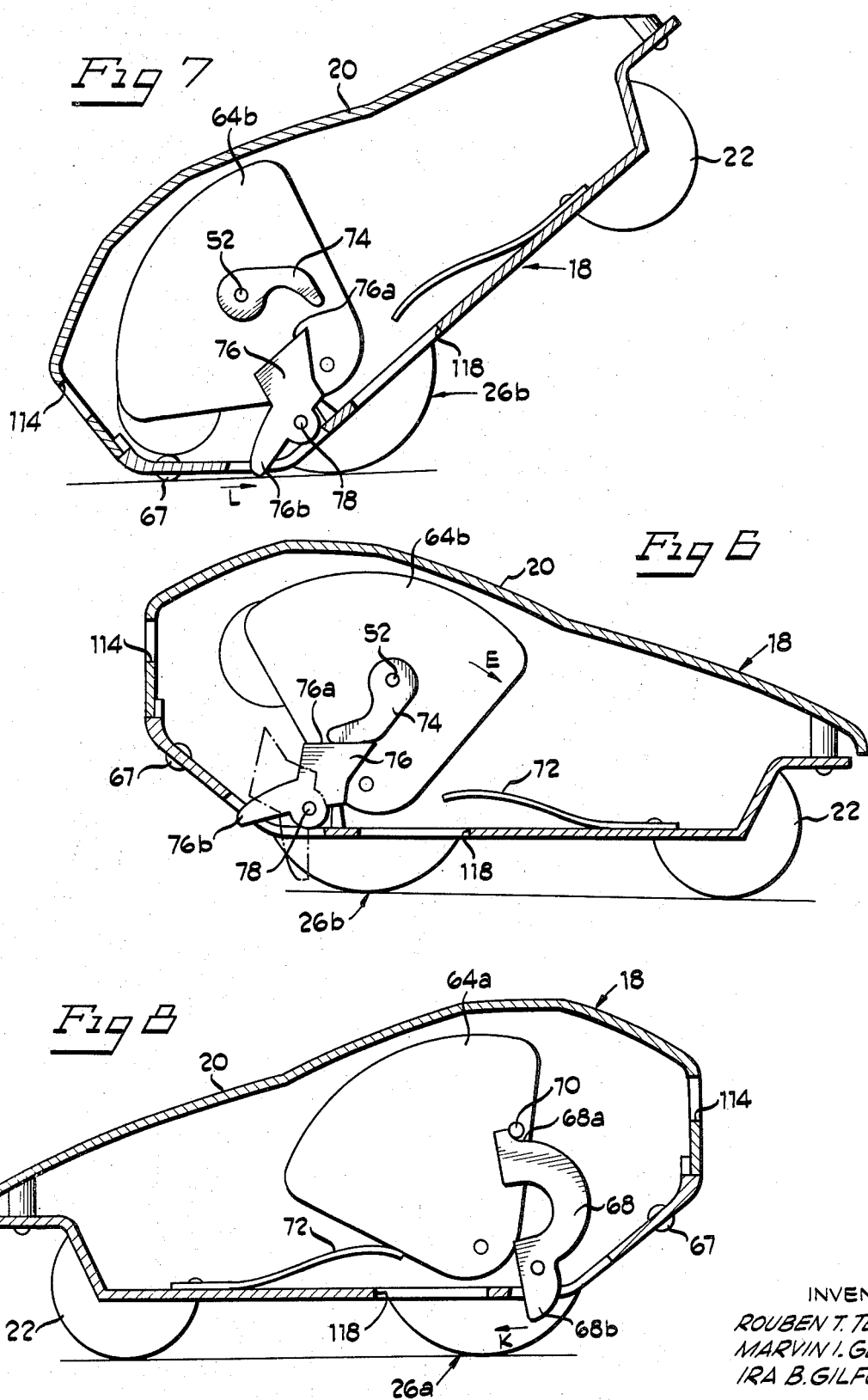

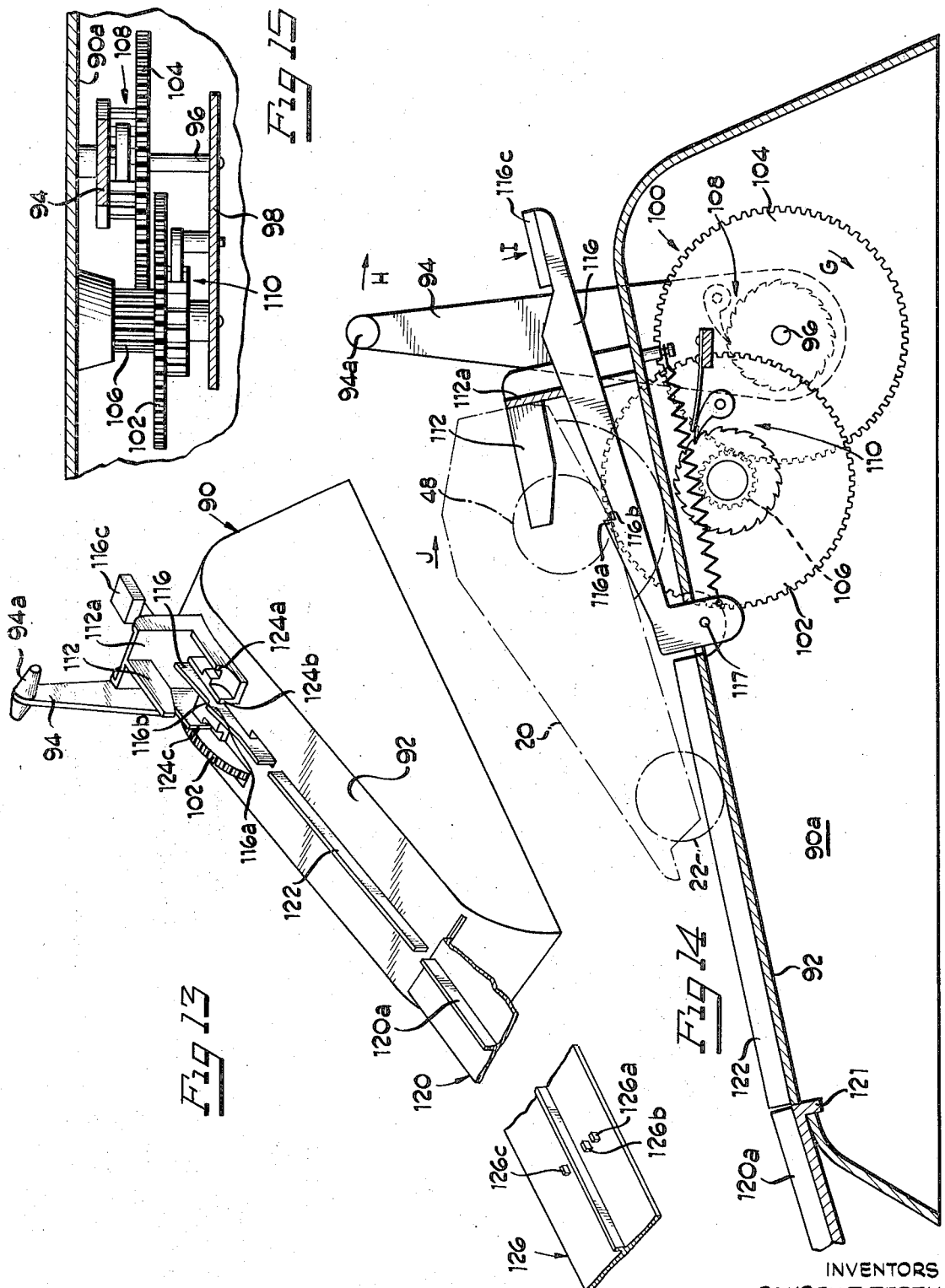

3,772,824

TOY VEHICLE APPARATUS

BACKGROUND AND SUMMARY OF THE INVENTION

This invention relates to a toy vehicle and in particular to a toy vehicle whose directions of motion or operating characteristics may be varied to perform "tricks" or "stunts" by a conditioning means operatively associated with operative control components of the vehicle to effectively program the series of operations of the vehicle.

Toy vehicles adapted to perform a predetermined sequence of movements, including forward and reverse motions and various turning or steering motions, are generally known. Such toy vehicles usually include steerable wheels turned in various steering directions by a follower controlled by a cam driven in timed relation to the vehicle motor. Normally, the vehicles are capable of only a single pattern of motion. Some attempts have been made to provide interchangeable means capable of changing the pattern of motion. However, the patterns of motion normally include only various turning or steering motions. The present invention is directed, in general, to toy vehicles of the character described and includes novel means effecting effectin "spinning" motions, "rocking" motions and other stunts or tricks by novel means which is capable of being conditioned or programmed to provide unusual patterns of motion.

In the exemplary embodiment of the invention, the toy vehicle includes a chassis having a pair of transversely spaced rear wheels mounted for rotation about a transversely extending rear axle, and motor means for driving the vehicle by rotating one of the rear wheels. The driven wheel is fixed transversely of and for rotation with the rear axle, and the other wheel is freely rotatable relative to and slidably mounted on the rear axle. The slidably mounted wheel is of a larger diameter than the driven wheel whereby the direction of travel of the vehicle varies as a function of the transverse position of the slidably mounted wheel. When the slidably mounted wheel is disposed close to the center of the vehicle, the vehicle is caused to spin about the slidably mounted wheel. As the vehicle spins about the slidably mounted wheel, centrifugal force will, in effect, cause the vehicle to move axially away from the slidably mounted wheel which, in effect, moves outwardly along the rear axle and causes the vehicle again to resume generally forward motion. A "dummy" wheel is fixed to the rear axle for rotation therewith, is disposed outside of the slidably mounted wheel, and comprises a cam means for locking the slidably mounted wheel for rotation with the driven rear axle. More particularly, interengaging surfaces are provided on the outside of the slidably mounted wheel and the inside of the dummy wheel to interlock said wheels when the slidably mounted wheel slides outwardly against the dummy wheel. Means are provided to selectively hold the slidably mounted wheel away from the dummy wheel and conditioning means are provided on a guide track to actuate said means to effectively program the spinning or forward motion of the vehicle.

The toy vehicle of the present invention is designed with its center of gravity close to the rear axle, and the motor means is mounted on the chassis for fore and aft movement relative to the rear axle to shift the center of gravity of the vehicle sufficiently fore and aft to cause the vehicle to rock or "rear up" about the rear axle as the motor means is shifted.

Another feature of the invention is the provision of a guide track along which the toy vehicle may travel. The guide track has upwardly protruding conditioning tabs disposed at selected positions along the track and operatively associated with control means on the vehicle including levers protruding from the underside of the vehicle to condition the various operating components of the vehicle and thereby effectively program the operating characteristics or movements of the vehicle. The guide track has an end from which the toy vehicle moves onto a floor or the like and the conditioning means is disposed adjacent the end of the guide track. Interchangeable end sections for the track have the conditioning tabs disposed thereon for varying the sequence or pattern of operating characteristics for the vehicle.

The guide track is part of a power conditioning ramp on which the toy vehicle is positionable for conditioning the vehicle's motor means which is shown herein in the form of a spring motor. A lever member is pivotally mounted on the ramp, and gear type linkage means is operatively associated with the lever and operatively engageable with a gear portion of the winding mechanism for the spring motor to condition the motor by cranking the lever which, in turn, winds the motor spring. The engaging gear of the linkage has a substantially larger diameter than the gear member of the vehicle's winding mechanism to provide a substantial mechanical advantage from the lever to the motor's winding mechanism. A ratchet and pawl mechanism is provided in the lever gear linkage to permit the lever to be oscillated about its pivot axis to wind the motor. Means are provided to hold the vehicle in position on the power ramp to condition the winding mechanism thereof, and means is provided to selectively release the vehicle and permit the vehicle to move along the ramp.

Other objects, features and advantages of the invention will be apparent from the following detailed description taken in connection with the accompanying drawings.

DESCRIPTION OF THE DRAWINGS

FIG. 1 is a perspective view of a toy vehicle embodying the concepts of the present invention;

FIG. 2 is a perspective view similar to that of FIG. 1, but with the toy vehicle rocked about its rear axle in a "reared up" position;

FIG. 3 is a horizontal section through the housing or body of the vehicle to illustrate the interior operating components thereof;

FIG. 4 is a vertical section taken generally along the line 4—4 of FIG. 3;

FIG. 5 is a vertical section taken generally along the line 5—5 of FIG. 3;

FIG. 6 is a vertical section taken generally along the line 6—6 of FIG. 3;

FIG. 7 is a vertical section similar to that of FIG. to rock but with the motor means and framework therefor shifted to the back of the vehicle to cause the vehicle to rock about its rear axle to a "reared up" position;

FIG. 8 is a vertical section taken generally along the line 8—8 of FIG. 3, with the motor means and framework therefor locked in a forward position to maintain the vehicle in a normal running position with all four wheels on the ground;

FIG. 9 is an exploded perspective view of the conditioning control levers and related components of the toy vehicle of the present invention;

FIG. 10 is an exploded perspective view of the right-hand "split wheel" as viewed in FIG. 5;

FIG. 11 is a perspective view of the locking arm for the spring storage drum of the motor means;

FIG. 12 is a perspective view of a modified form of vehicle embodying the concepts of the present invention;

FIG. 13 is a perspective view of the power conditioning ramp and guide track of the present invention;

FIG. 14 is a vertical section through the power conditioning ramp of FIG. 13, with the toy vehicle of FIG. 1 shown positioned thereon, in phantom; and FIG. 15 is a partial horizontal section through the power conditioning ramp showing the interior gear linkage thereof.

DETAILED DESCRIPTION OF THE INVENTION

Referring to the drawings in greater detail, the exemplary embodiment of the toy vehicle of the present invention, generally designated 18, includes a chassis having a generally hollow body or housing 20, a pair of front wheels 22 mounted on a front axle 24 journalled in the housing 20, a pair of rear wheels, generally designated 26a and 26b, mounted on a rear axle 28, and a constant speed spring powered motor means, generally designated 30.

Referring particularly to FIGS. 4 and 5, the spring powered motor 30 has a storage drum 32 for a winding power spring 34 and an output drum 36 on which the spring 34 is wound to condition the motor for providing an output to the rear wheel 26a, through the rear axle 28 as described below. As is apparent from FIG. 4, if the output drum 36 is rotated in the direction of arrow A, the spring 34 will be wound onto the output drum 36 as it is wound off of the storage drum 32, the storage drum rotating in the direction of arrow B. In order to avoid tearing the end of the spring off of the storage drum 32, a pawl arm 38 is biased by a spring 40 into a recess 42 on the periphery of the storage drum 32 to prevent further rotation of the storage drum 40 in the direction of arrow B after the last turn of the spring is wound off of the storage drum. The pawl arm 38 and its biasing spring 40 are shown more clearly in FIG. 11. Before going into the winding mechanism for the spring motor, it should be pointed out that a similar precautionary means, namely a second pawl arm 44 which can seat against a shoulder 46 on the periphery of the output drum 36, is provided to prevent tearing the opposite end of the spring 34 off of the output drum 36 at the end of the power operation of the vehicle.

The spring 34 is wound onto the output drum 36 by means including a gear 48 (see FIG. 5) mounted on the inside of the rear wheel 26a, the wheel 26a and gear 48 being fixed to the rear axle 28 for rotation therewith. Another gear 50 is fixed to a rectangular shaft 52 which also is fixed to and forms the axis of rotation of the output drum 36. A linkage gear 54 is mounted on the rear axle 28 and is in mesh with the output drum gear 50. Thus, it will be apparent that rotation of the rear wheel gear 48 is transferred through the rear axle 28 to the linkage gear 54 and, thus, to the output drum gear 50. Rotation of the output drum gear 50 in the direction of arrow C (FIG. 4) winds the spring 34 onto the output drum 36 and off of the storage drum 32.

A slip clutch, generally designated 56 in FIG. 5, is provided operatively between the rear axle 28 and the linkage gear 54 for the winding mechanism for the motor. The slip clutch includes a pair of washer-like abutment members 58 and 60 fixed to the rear axle 28 and which define a pair of spaced, facing abutment surfaces on the rear axle. The linkage gear 54 is disposed between the abutment washers 58 and 60 (i.e., the facing abutment surfaces defined thereby) and is freely rotatable relative to the rear axle 28. A coil spring 62 surrounds the rear axle 28 in the area between the abutment washers 58 and 60, with one end of the coil spring bearing against the abutment washer member 58 and the other end of the coil spring forcing the linkage gear 54 against the other abutment washer member 60 into friction driving engagement therewith. The friction between the linkage gear 54 and the abutment washer member 60 and spring 62 therefore defines the torque limit of the clutch. The slip clutch is provided to prevent damage to the operating components of the vehicle that might be caused by the abrupt stoppage of the unwinding motion of the spring 34 as the pawl arm 44 comes into engagement with the shoulder 46 on the output drum 36. In the event that the rear wheels 26a and 26b of the vehicle would be constructed with relatively substantial masses, substantial stresses and strains could be created on the vehicle's operating components due to any abrupt stoppage of the unwinding motion of the spring 34.

The device of the present invention has means to effectively shift the center of gravity of the vehicle sufficiently fore and aft of the rear axle 28 to cause the vehicle to rock about the rear axle as shown in FIGS. 1 and 2 and in FIGS. 6 and 7, to simulate the "rearing up" of actual drag type racers which are quite popular at the present time. More particularly, the spring type motor means 30 described above, including the storage drum 32, output drum 36, spring 34, gear 50 and pawl arms 38 and 44 all are mounted on a framework which includes a pair of spaced plate members 64a and 64b held in spaced relationship by a pair of braces 66a and 66b. The pawl arm 38 and biasing spring 40 are mounted on the rear brace 66b. The plates 64a, 64b are generally triangularly shaped and are pivotally mounted to the vehicle's rear axle 28. Thus, the motor means 30 may be shifted fore and aft relative to the vehicle simply by pivoting the motor means and its supporting plates 64a, 64b back and forth in the direction of arrows D (FIG. 4).

Of course, it is to be understood that the vehicle is designed so that as much weight as possible is located in the area of the rear axle 28 so that the shifting of the motor means and its supporting framework is capable of shifting the center of gravity of the vehicle sufficiently to cause the vehicle to rock about the rear axle 28. It also should be pointed out that in the embodiment of the invention shown herein, the motor means and its supporting framework is so designed relative to the rear axle 28 that the motor means normally is disposed in a rear position under its own weight (See FIG. 7) to cause the vehicle to rear up as shown in FIGS. 2 and 7. When in its "reared up" position the vehicle is stabilized by means of a supporting wheel 67 at the rear of the vehicle which rotates and thereby reduces friction when the vehicle moves while in the reared up position.

Referring to FIG. 8, means are provided to hold the motor means 30 and the supporting plates 64a, 64b in a forward direction, with the center of gravity of the vehicle shifted forwardly of the rear axle 28 to maintain all four wheels of the vehicle on the ground. More particularly, a locking, conditioning control lever 68 is provided and has a shoulder portion 68a which seats under a pin 70 fixed to the motor means support plate 64a to prevent the motor means from shifting back to the rear of the vehicle and thereby shifting the center of gravity of the vehicle behind the rear axle 28. A supporting spring arm 72 is disposed within the vehicle, on the bottom wall of the body 20, for supporting the motor means and its mounting framework while in their forward position as shown in FIG. 8. The spring arm 72 also creates biasing pressure to maintain pin 70 locked behind shoulder 68a. For purposes to be described in greater detail hereinafter, a tab portion 68b of the locking, conditioning control lever 68 is exposed on the underside of the vehicle so that selective engagement therewith would effectively lock the motor in its forward position or release the motor so that it will shift to its normal rearward position.

Referring to FIGS. 6 and 7, means is provided to intermittently shift the motor means and framework back and forth relative to the rear axle 28 automatically in response to operation of the motor means 30, i.e., unwinding of the spring 34 off of the output drum 36. More particularly, a cam member 74 is fixed to the shaft 52 of the output drum 36 for rotation therewith. A conditioning abutment member 76, having an abutment surface 76a, is pivotally mounted by means of a pin 78 inside of the sidewall of the vehicle body 20. The conditioning abutment member 76 is shown in phantom in an inoperative position in FIG. 6. However, by pivoting the abutment member 76 from the position shown in phantom in FIG. 6 to the position shown in full lines in FIGS. 6 and 7 the abutment surface 76a will be brought into the path of rotation of the cam member 74. As the cam member 74 is rotated by the unwinding of spring 34, from the position shown in FIG. 7 to the position shown in FIG. 6, the cam member will ride along the abutment surface 76a and bias or push the motor means 30 and its supporting framework forwardly in the direction of arrow E (FIG. 6) to cause the front of the vehicle to drop down to the position shown in FIG. 6. As the cam member 74 rides off of the front of the abutment surface 76a, the motor again will shift to the rear of the rear axle 28 due to the momentum of the spring motor and then under gravity due to the weight of the motor, and again cause the vehicle to rear up as shown in FIG. 7. Thus, should the abutment member 76 be conditioned to the position shown in full lines in FIGS. 6 and 7, the vehicle will be caused to intermittently rear up and then fall back down to its position of FIG. 6 during the operation of the motor means, i.e., the unwinding of the spring 34. As with the conditioning locking member 68, the abutment member 76 has a tab portion 76b which may be exposed on the underside of the vehicle for selective conditioning of the abutment member 76. Of course, the control lever 68 must not be locking the motor forward in order to permit such rocking motion.

Referring particularly to FIGS. 3 and 5, the righthand rear wheel 26a is fixed to the rear axle 28 for rotation therewith and is driven by the spring motor means 30. In addition, the rear wheel 26a is fixed axially of the rear axle 28 in its position shown best in FIG. 5. Rear wheel 26a has a body portion 26a' which is covered by a tread material 26a''. The left-hand rear wheel 26b is a "split wheel" and includes an inner operating wheel portion 80 covered by a tread portion 80a. The inner operating wheel portion 80 is slidably mounted on the rear axle 28 and is freely rotatable relative thereto. The split wheel 26b further includes an outer "dummy" wheel portion 82 which includes a body portion 82a covered by a tread material 82b. It should be pointed out that the inner operating wheel portion 80 is of a larger diameter than either the wheel 26a or the dummy wheel portion 82. With the inner operating wheel portion 80 slidably mounted on the rear shaft 28 and freely rotatable relative thereto, various operating characteristics of the vehicle are afforded as a function of the transverse position of the operating wheel portion 80 axially along the rear axle 28. More particularly, if the operating wheel portion 80 is positioned axially sufficiently toward the center of the vehicle, in the direction of arrow F (FIG. 5), the vehicle will effectively pivot or spin about the operating wheel portion 80, as the opposite wheel 26a is driven by the spring motor. This is especially true when the vehicle is in its reared up position as shown in FIGS. 2 and 7. To facilitate the spinning action, the tread 80a of the operating wheel portion 80 is chamfered, as seen in FIGS. 3 and 5, to present a circular edge which reduces friction and thereby enhances the spinning action. Should the operating wheel portion 80 be positioned outwardly along the shaft 28, opposite the direction of arrow F (FIG. 5), because of its larger diameter, the vehicle will move forwardly and be made to turn slightly to the right as viewed in FIG. 3. The operating wheel portion 80 is shown in its innermost position in FIG. 5.

As stated above, the outer dummy wheel portion 82 is fixed to the rear axle 28 for rotation therewith and is of a smaller diameter than the inner operating wheel portion 80. In other words, the outer dummy wheel portion 82 never engages the ground. However, it acts as a cam member and when coupled with the inner operating wheel portion 80 the vehicle is caused to travel in a substantially straight path, although slightly curved due to the larger diameter of wheel 80. FIGS. 5 and 10 show an annular rib portion 82c, having a slot 82d, on the inside of the outer dummy wheel portion 82. The slot 82d is adapted to receive a straight rib portion 80b on the inner wheel portion 80 to provide interengaging surfaces to couple the split wheel portions together, as described above. As best seen in FIGS. 3 and 9, a locking, conditioning arm member 84 is pivoted to the outside of the vehicle body 20 and has a lip portion 84a which is capable of seating on the outside of a ring 86 fixed to the inner operating wheel portion 80. As viewed in FIG. 3, with the lip portion 84a disposed along the outside of the ring 86, the inner operating wheel portion 80 is locked in its inner position so that the vehicle will continuously pivot or spin thereabout. As with members 68 and 76, the locking conditioning arm member 84 has a tab portion 84b capable of being exposed on the underside of the vehicle for selective conditioning, as described in greater detail hereinafter.

With the inner operating wheel portion 80 unlocked so that it is free to move axially relative to the rear drive shaft 28, the vehicle, particularly in its reared up position as shown in FIGS. 2 and 7, has unique operating characteristics. Since the slidably mounted wheel portion 80 is of a larger diameter than the opposite wheel 26a, it has a tendency to cause the vehicle to curve to the right, as described above. As the vehicle travels in such a curved path, the center of the vehicle tends to move axially toward the slidably mounted wheel 80. However, when the slidable wheel reaches a particular inner limit, depending on the weight distribution of the vehicle, the vehicle will spin about the wheel 80. The spinning action of the vehicle creates centrifugal force which pulls the vehicle outwardly away from the slidably mounted wheel portion and, in effect, moves the wheel portion outwardly into interengagement with the dummy wheel 82. The vehicle then will begin forward motion until the axially movable wheel portion 80 again is positioned inwardly of the rear axle and again causes the vehicle to spin. This repetitive motion is continued unless the axially movable wheel portion is locked in a particular position.

With the above described mechanisms, it is apparent that various operating characteristics of the vehicle can effectively be programmed by conditioning the members 68, 76 and 84. More particularly, the axially slidable wheel portion 80 may be locked in its spinning condition and the motor means may be caused to oscillate back and forth by operatively positioning the member 76 so that the vehicle will rock up and down as shown in FIGS. 6 and 7 while continuously spinning. In addition, by unlocking the axially slidable wheel portion 80 and again causing the motor to oscillate fore and aft, the vehicle will be made to alternately spin and travel straight while at the same time alternately rocking up and down.

As seen in FIG. 4, a leaf spring 130 may be provided within the body 120 of the vehicle for engagement with the linkage gear 54 to provide a noise making mechanism responsive to rotation of the output drum 36.

FIGS. 13 through 15 show a power conditioning ramp and guide track for use in combination with the toy vehicle of the present invention; namely, for winding the motor means 30 and for conditioning the various operating components of the vehicle described above. The ramp includes a generally hollow base portion, generally designated 90, which has an upper inclined ramp surface 92 on which the toy vehicle is positionable. A lever member 94, having a handle portion 94a, is pivotally mounted on the base portion 90 by means of a shaft member 96 journalled in a sidewall 90a of the base portion and a support plate 98 (FIG. 15) disposed within the housing. A gear train or linkage, generally designated 100, is operatively associated with the lever member 94 and includes a gear 102 operatively engageable with the gear 48 mounted on the wheel 26a of the toy vehicle in order to condition the motor means 30 by winding the spring 34 in response to cranking the lever member 94. More particularly, a gear 104 is mounted for rotation in the direction of arrow G (FIG. 14) in response to the lever member 94 being cranked in the direction of arrow H. Gear 104 meshes with a smaller gear 106 which is coupled for rotation with the larger gear 102. The gear 102, in turn, is larger in diameter than the toy vehicle gear 48. It is apparent that by using these two pairs of "step down" gears in the train 100 thereof, a substantial mechanical advantage is obtained from the pivoted lever 94 to the winding mechanism of the motor means. A ratchet and pawl mechanism, generally designated 108, is operatively associated with the lever gear 104 and a similar ratchet and pawl mechanism, generally designated 110, is associated with the gears 102 and 106 so that the spring motor means 40 may be wound by pivotally oscillating the lever member 94, without unwinding the spring on the "backstroke" of the lever.

A hold-down arm 112 is rigidly secured by means of a support brace 112a to the base 90 of the power conditioning ramp. The hold-down arm extends through a slot 114, as seen in FIG. 8, in the rear of the vehicle body 20. The arm bears against the bottom of the slot 114 to hold the vehicle in position with the vehicle winding gear 48 meshed with the power conditioning ramp gear 102.

A latch arm 116 is pivoted by a pin 118 to the base portion 90 of the power conditioning ramp and has a latching lip 116a which terminates rearwardly in a latching shoulder 116b. The latching lip 116a extends upwardly through a slot 118 (see FIGS. 5 and 8) on the underside of the vehicle body 20 and the latching shoulder 116b abuts against the rear edge of the slot 118 to hold the toy vehicle in the proper power conditioning position shown in phantom in FIG. 14. After the motor 30 is wound by cranking the lever member 94, the toy vehicle may be released for movement down the inclined top surface 92 of the power conditioning ramp simply by pressing down on the end 116c of the latch arm 116, in the direction of arrow I (FIG. 14).

A guide track, generally designated 120 (FIG. 13), is provided and extends away from the front end of the power conditioning ramp. The track has a lip 121 along its rear edge which seats in a slot 121a at the front of the ramp. The guide track 120, as well as the upper ramp surface 92, have guiding ribs 120a and 122, respectively, which extend upwardly between a pair of downwardly extending ribs 124 on the underside of the vehicle, as best seen in FIGS. 4 and 5. The complementary ribs 124 on the vehicle and 120a and 122 on the guide track 120 and ramp surface 92, respectively, guide the vehicle in its movement down the ramp and along the track.

As best seen in FIG. 13, the power conditioning ramp has three abutment shoulders 124a, 124b and 124c generally at the rear thereof. These three abutment shoulders are adapted to engage the tab portions 84b, 68b and 76b, respectively, of the conditioning members 84, 68 and 76, respectively, described above. The abutment shoulders 124a, 124b and 124c, force the tab portions forwardly as the vehicle is forced rearwardly toward its power conditioning position, in the direction of arrow J (FIG. 14). It will be understood that by forcing the tab portion 68b forward in the direction of arrow K (FIG. 8) the conditioning member 68 will lock the motor means 40 and its related framework in a forward position, as shown in FIG. 8, to prevent the toy vehicle from rearing up as it travels down the ramp and guide track, thereby stabilizing the vehicle. It will be understood that by forcing the tab portion 84b forwardly by means of the shoulder 124b on the power conditioning ramp, the axially slidable wheel portion 80 will not be locked in its inner position to effect spinning of the vehicle. It also will be understood that by forcing the tab portion 76b forwardly in the direction of arrow L (FIG. 7) by means of the shoulder 124c on the power conditioning ramp, the abutment member 76 will be moved out of the path of movement of the rotating cam member 74, again to prevent the vehicle from rocking or rearing up as it moves down the ramp and guide track.

In order to selectively program the operating characteristics of the toy vehicle after it leaves the guide track 120, interchangeable end sections 120a are provided with one, two or three upwardly protruding tabs 126a, 126b and 126c. These tabs 126a, 126b and 126c are positioned in the path of movement of the downwardly depending tab portions 84b, 68b and 76b, respectively, of the conditioning members 84, 68 and 76, respectively. More particularly, if a tab 126a is disposed on the track end section 120a for engagement with the tab portion 84b of the conditioning member 84, the axially slidable wheel portion 80 will be locked in a spinning condition. If a tab 126b on the track end section 120a is disposed in the path of movement of the downwardly depending tab portion 68b of the conditioning member 68, the conditioning member will release the motor means from the forward position shown in FIG. 8 and the motor means will shift rearwardly and cause the front end of the toy vehicle to rear up. Similarly, if a tab 126c is disposed on the track end section 120a in the path of movement of the downwardly depending tab portion 76b of the conditioning member 76, the conditioning member 76 will be pivoted to the position shown in FIGS. 6 and 7 and effectively cause the vehicle to rock back and forth about the rear axle 28. Thus, it will be apparent that by providing a plurality of different interchangeable track end sections 120a having different combinations of the upwardly protruding tabs 126a, 126b and 126c, the operating characteristics of the vehicle, as described in detail above, can be controlled or selectively programmed simply by changing the track end sections.

FIG. 12 shows a modified toy vehicle, generally designated 130, embodying the concepts of the present "invention", in the form of a motorcycle, or the like.

The foregoing detailed description has been given for clearness of understanding only and no unnecessary limitations should be understood therefrom as some modifications will be obvious to those skilled in the art.

We claim:

1. A toy vehicle which includes a chassis having a pair of transversely spaced wheels mounted for rotation about transversely extending axes, and motor means for driving said vehicle by rotating at least one of said wheels, the improvement comprising: means fixing one of said wheels transversely relative to its axis of rotation, and means slidably mounting the other of said wheels relative to its transverse axis of rotation so that the direction of travel of the vehicle may vary as a function of the transverse position of said other wheel.

2. The toy vehicle of claim 1 wherein said other wheel has a larger diameter than said one wheel.

3. The toy vehicle of claim 1 wherein said one wheel is power rotated by said motor means and said other wheel is freely rotatable about its respective axis of rotation independently of the motor means.

4. The toy vehicle of claim 3 wherein said means slidably mounting said other wheel permits said other wheel to be positioned inwardly toward the center of said vehicle sufficiently to effectively cause the vehicle to pivot about said other wheel.

5. The toy vehicle of claim 4 wherein said other wheel has means defining an outer annular surface which is chamfered to present a circular edge to facilitate said pivoting action.

6. The toy vehicle of claim 4 including cam means fixed axially of and for rotation with said shaft and said other wheel being movable axially of and freely rotatable relative to the shaft, and including means defining interengaging surfaces between said other wheel and said cam means to interlock said other wheel for rotation with the shaft when said other wheel is positioned outwardly against the cam means.

7. The toy vehicle of claim 6 including retaining means to selectively hold said other wheel away from said cam means in said pivoting position.

8. The toy vehicle of claim 7 including, in combination, means defining a drive ramp for said vehicle, said drive ramp including means to actuate said retaining means as the vehicle travels along the drive ramp.

9. A toy vehicle which includes a chassis having a body, a pair of transversely spaced wheels mounted for rotation about a transversely extending axis, and motor means on said body for driving said vehicle by rotating at least one of said wheels, the improvement comprising means on said chassis providing for the shifting of said motor means fore and aft relative to said axis, the weight of said motor means being sufficiently large relative to the remainder of said vehicle to shift the center of gravity of the vehicle sufficiently fore and aft relative to said axis and thereby cause the vehicle body to rock about said axis as the motor is shifted.

10. The toy vehicle of claim 9 including means to hold said motor means in a fixed position relative to said axis to prevent the vehicle from rocking about the axis.

11. The toy vehicle of claim 9 including means for automatically shifting said motor means fore and aft relative to said axis as the vehicle is driven.

12. The toy vehicle of claim 11 wherein said automatic shifting means is operatively associated with said motor means and includes means to intermittently rock the motor means fore and aft relative to said axis as the motor means drives the vehicle.

13. The toy vehicle of claim 12 wherein said motor means is mounted on a framework which, in turn, is pivotally mounted on said chassis, the motor means including a rotatable shaft journalled on said framework and spaced from the pivot axis thereof, a cam member fixed to said motor shaft for rotation therewith, and an abutment member on said chassis intermittently engageable by said cam member to effectively cause said framework and the motor means thereon to oscillate fore and aft about said pivot axis.

14. The toy vehicle of claim 13 including means for selectively moving said abutment member out of the path of said cam member to prevent engagement thereby.

15. The toy vehicle of claim 9 wherein said motor means is mounted on a framework which, in turn, is mounted on said chassis for pivotal movement about an axis parallel to the axis of rotation of said wheels so that the motor means may be shifted fore and aft by pivoting said framework.

16. The toy vehicle of claim 15 wherein the pivot axis of said framework is concentric with the axis of rotation of said wheels.

17. The toy vehicle of claim 16 wherein said framework and the motor means mounted thereon normally is maintained on one side of said pivot axis under the force of gravity, and said means providing for the shifting of said motor means includes means to hold the framework and the motor means substantially on the opposite side of said pivot axis.

18. The toy vehicle of claim 17 wherein said means to hold the framework on the opposite side of said pivot axis is releasable, and including, in combination, means defining a driver ramp for said vehicle, said drive ramp including means to release said holding means as the vehicle travels along the ramp.

19. A toy vehicle which includes a chassis having a pair of transversely spaced wheels mounted for rotation about a transversely extending axis, motor means for driving said vehicle by rotating at least one of said wheels, the improvement comprising means on said chassis providing for the shifting of the center of gravity of the vehicle sufficiently fore and aft relative to said axis to cause the vehicle to rock about the axis.

20. A toy vehicle, comprising: a chassis having at least one wheel fixed to a drive shaft for rotation therewith, motor means for driving said vehicle by rotating said wheel, said motor means being of the spring motor type wherein the motor is capable of coming to an abrupt stop when the spring runs out, a gear train between said spring motor and said drive shaft, and a slip clutch operatively associated with one of the gears in said train thereof to permit said drive shaft and the wheel fixed thereto to "wind down" after the spring motor stops.

21. The toy vehicle of claim 20 wherein said drive shaft has means defining a pair of spaced, facing abutment surfaces, said one gear in said train thereof is freely rotatably and slidably mounted on said drive shaft between said abutment surfaces, and said slip clutch comprises a coil spring surrounding said drive shaft in the area between said abutment surfaces, one end of the coil spring bearing against one of said abutment surfaces and the other end of the coil spring forcing said one gear into friction driving engagement with the other abutment surface, said friction defining the torque limit of the clutch.

* * * * *